United States Patent [19]

Kalev et al.

[11] 3,995,138

[45] Nov. 30, 1976

[54] PULSE-DC ARC WELDING

[75] Inventors: Lyubomir Tzonev Kalev; Kostadin Zikov Zikov; Ivan Kirilov Marvakov, all of Sofia, Bulgaria

[73] Assignee: Institute po Metaloznanie i Technologie na Metalite, Sofia, Bulgaria

[22] Filed: Dec. 17, 1974

[21] Appl. No.: 533,713

[30] Foreign Application Priority Data

Dec. 17, 1973 Bulgaria.................................. 27445

[52] U.S. Cl................................... 219/137; 219/135
[51] Int. Cl.[2]............................................ B23K 9/06
[58] Field of Search............... 219/131 WR, 137 PS, 219/135, 131 F, 131 R

[56] References Cited

UNITED STATES PATENTS

| | | | |
|---|---|---|---|
| 3,496,330 | 2/1970 | Needham | 219/137 PS |
| 3,519,780 | 7/1970 | Potapievsky et al. | 219/135 |
| 3,683,149 | 8/1972 | Mages et al. | 219/137 PS |

FOREIGN PATENTS OR APPLICATIONS 162,262    1/1971    U.S.S.R. .................... 219/137 PS

*Primary Examiner*—J. V. Truhe
*Assistant Examiner*—Clifford C. Shaw

[57] ABSTRACT

An improved technique of pulsed-arc welding is described for applying, to a consumable welding electrode, a DC welding current on which is superimposed a cyclic, high-amplitude pulse component. The pulse-generating circuit includes a capacitor chargeable during the existence of the arc, such capacitor having a normally disabled discharge path including a first thyristor. Such thyristor is energized at a rate of 200–1,000 Hz from a trigger generator, which in turn is energized during the existence of the arc. The discharge pulses from the capacitor are coupled to the welding electrode via a pulse transformer whose secondary winding is isolated from the DC source via a blocking diode. The pulse-generating circuit is so designed that the pulses have a duration in the range of $0.5 \times 10^{-4}$ to $5 \times 10^{-4}$ sec., a front edge steepness greater than $8 \times 10^6$ amps/sec., and an amplitude selected so that the pulse current density through the welding electrode is greater than 720 amps./mm.

1 Claim, 2 Drawing Figures

PULSE-DC ARC WELDING

BACKGROUND OF THE INVENTION

The invention relates to pulsed-DC arc welding, and more particularly to techniques of this type in which a welding current having a cyclic pulse component superimposed on a steady DC component, is applied to a consumable welding electrode in contact with a work to be welded in a protective medium.

Existing pulsed-arc systems of this type suffer from several drawbacks. In particular, unless an inert gas atmosphere (e.g. principally argon) is maintained, it is difficult in existing systems to control the rate and characteristic of the transfer of drops of molten metal from the welding electrode to the work during the formation of a weld seam. Additionally, in the absence of such an inert atmosphere (and in particular in the presence of active gases such as carbon dioxide), the danger of back-blowing of the molten metal is always present.

In addition to exhibiting a low efficiency in the presence of active media such as carbon dioxide, such existing pulsed-arc welding processes employ, for the generation of the pulse component of the arc, either phase-pulsed thyristor control or thyristor-instrumented interruption switches interposed between a DC source and the welding electrode. The first of these techniques is subject to severe frequency limitations imposed by the frequency of the AC mains, while the latter technique is subject to a relatively low peak amplitude level of the pulses.

SUMMARY OF THE INVENTION

These disadvantages are overcome by the improved pulsed-arc welding technique of the invention, which is fully compatible with protective media in the form of active gases such as carbon dioxide. In an illustrative embodiment, the pulse-generating circuit includes a capacitor having a switched charging circuit that is operable only during the existence of the arc. A discharge circuit including a choke, a primary winding of a pulse transformer, and a normally disabled first thyristor are coupled across the capacitor. The inductance of the discharge circuit cooperates with the capacitor to cyclically reverse the polarity across the first thyristor.

The pulse-type discharge of the capacitor is coupled to the welding electrode via the secondary winding of the pulse transformer and a blocking diode which isolates such secondary winding from the output of the DC source. The pulse repetition rate of the pulses is determined by the rate of excitation of the control electrode of the first thyristor, which is coupled to the output of a trigger generator that in turn is rendered effective during the existence of the arc. In order to facilitate the disabling of the pulse generator when the arc is to be extinguished, the trigger generator includes facilities which respond to the extinguishing of the arc to energize, simultaneously with the first thyristor, a second thyristor connected across the primary winding of the pulse transformer in series-aiding relation with the second thyristor.

The components of the discharge circuit, the pulse transformer and the trigger generator are so chosen that (a) the pulse duration is in the range of $0.5 \times 10^{-4}$ to $5 \times 10^{-4}$ sec., (b) the steepness of the pulse front is greater than $8 \times 10^{6}$ amps/sec., (c) the pulse repetition frequency is in the range of 200–1,000 Hz, and (d) the pulse current density through the welding electrode is greater than 720 amps/mm.

In addition to overcoming the above-mentioned disadvantages of the prior art, the embodiments of the invention, when employed with an active protective medium, effectively overcomes the high surface tension of the molten metal at the tip of the welding electrode, so that drops of such molten metal can be transferred to the weld seam in a controlled manner. Additionally, the arrangement of the invention has been found to eliminate the bevelling of the faces of the welded parts, a phenomenon which is common with the use of previously known methods.

BRIEF DESCRIPTION OF THE DRAWING

The invention is further set forth in the following detailed description taken in conjunction with the appended drawing, in which.

DETAILED DESCRIPTION

Figure 1:
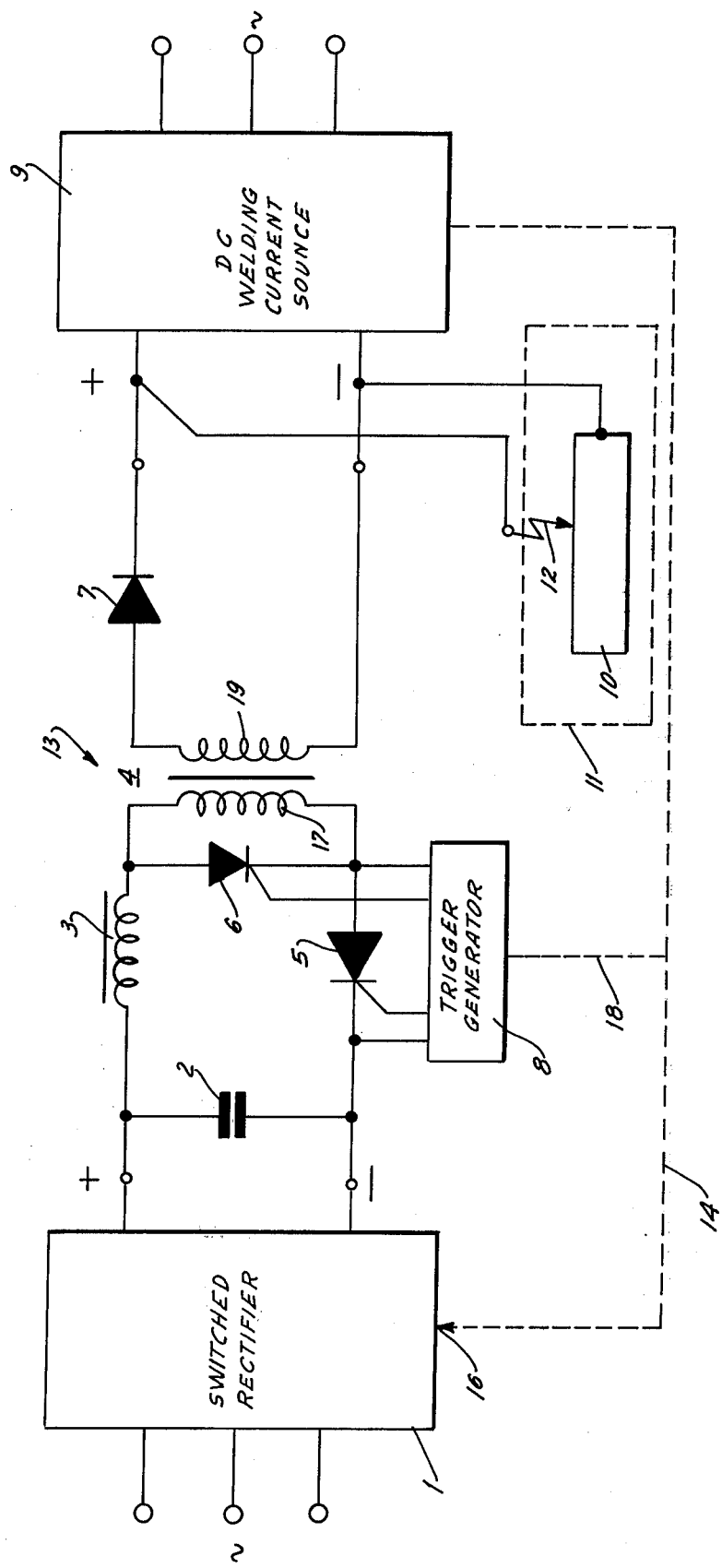
FIG. 1 is a combined block and schematic diagram of a pulsed-arc welding apparatus constructed in accordance with the invention.

Referring now to the drawing, FIG. 1 illustrates in schematic form a workpiece 10 which is disposed in a protective atmosphere consisting principally or exclusively of an active gas such as carbon dioxide. The gas-filled enclosure in which the workpiece 10 is situated is schematically represented at 11. The workpiece is conductively connected as shown to a negative terminal of a conventional DC welding current source 9 excited from AC mains as shown. Disposed in arc-striking relation with the workpiece 10 within the enclosure 11 is a conventional consumable welding electrode 12, which is connected to the positive terminal of the DC source 9. When the arc is established, the flow of current from the source 9 via the electrode 12 and the workpiece 11 establishes the steady DC current component of the welding current.

The cyclic pulse component of the welding current to be applied to the electrode 12 is supplied from a pulse-generating circuit 13 constructed in accordance with the invention.

In the illustrative embodiment shown, the circuit 13 includes a capacitor 2 which is chargeable from a conventional switched rectifier 1 that in turn is coupled to the AC mains. The charging path through the unit 1 is made operative during the existence of the arc through the workpiece 10 by means of a control path represented at 14 extending from a suitable portion of the DC welding current source 9 to a control input 16 of the rectifier 1. In particular as soon as a conductive path between the positive and negative terminals of the welding current source is established by an arc between the electrode 12 and the workpiece 10, the rectifier 1 may be enabled via the path 14.

In order to generate the welding pulses, the capacitor 2 is cyclically discharged through an output path that includes a choke coil 3, a primary winding 17 of a pulse transformer 4, and the transconductive path of a first thyristor 5, all of such components being connected in series relation. The control electrode of the thyristor 5 is cyclically excited (preferably at a rate of 200–1,000 Hz) by means of a trigger generator 8. The generator 8 is enabled during the existence of the arc by means of a path 18 extending from the DC source 9. The polarity of the regulator 1 is chosen to be in series-aiding relation with the polarity of the switched rectifier 1, so that the application of trigger pulses to the control electrode of the thyristor 5 will render such thyristor initially conductive, thereby initiating the start of the pulse component of the welding current as indicated below.

In order to establish the pulse duration, the inductance of the choke 3 and the primary winding 17 are so associated with the capacitance of the capacitor 2 that the resulting oscillation in the discharge path will reverse the polarity across the thyristor 5 at a predetermined time after the start of capacitor discharge. Preferably, in the arrangement shown, the above-recited components should be chosen such that the pulse duration falls within the range of $0.5 \times 10^{-4}$ to $5 \times 10^{-4}$ sec.

The pulses generated during the cyclic discharge of the capacitor 2 are coupled to the welding electrode via a secondary winding 19 of the pulse transformer 4 and a blocking diode 7, which is interposed between the positive terminal of the DC welding source 9 and the winding 19 to isolate the DC component of the welding current from the pulse transformer. Preferably, the components of the pulse transformer are chosen in association with those of the discharge circuit of the capacitor such that the steepness of the front of each pulse applied to the welding electrode 12 is greater than $8 \times 10^6$ amps/sec.

Moreover, the amplitude of such pulses is so chosen that the pulse current density through the welding electrode 10 is greater than 720 amps/mm.

Figure 2:
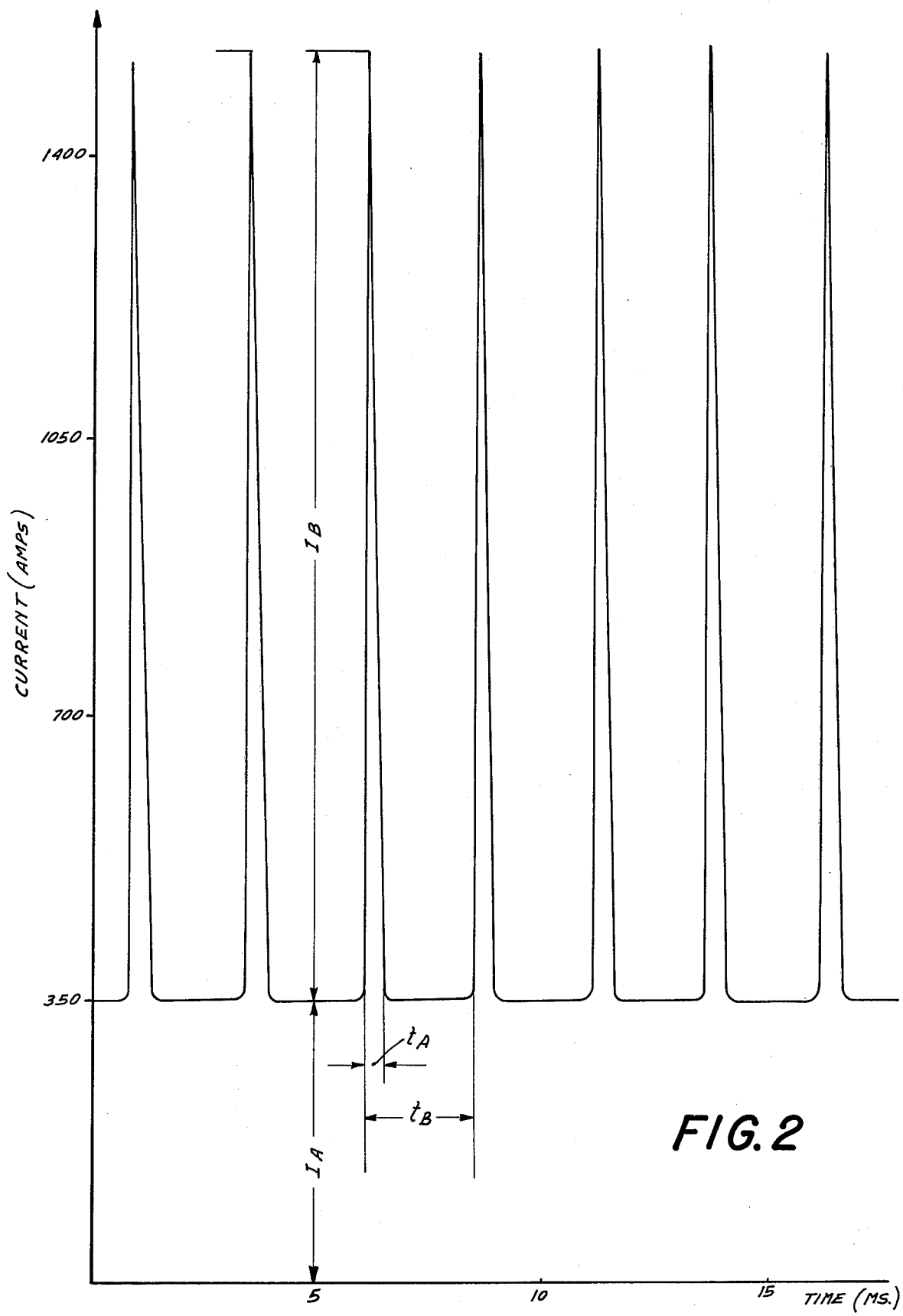
FIG. 2 is a graph illustrating a desirable welding current characteristic obtainable with the arrangement of FIG. 1.

It will be noted from an inspection of FIG. 2 that $I_B$ is about 1150 amperes. Consequently, the requirement that the pulse current density be greater than 720 amps/mm$^2$ indicates that the diameter of the welding electrode should be about 1.6 mm or less. Further, since the DC component of current $I_A$ indicated in FIG. 2 is about 350 amperes, the current density of the DC welding current component through the welding electrode will be greater than 100 amps/mm$^2$.

In order to aid in the disabling of the pulse-generating circuit 13 when the arc through the workpiece 10 is extinguished, a second thyristor 6 is coupled across the primary winding 17 in series-aiding relation with the thyristor 5. The control electrode of the thyristor 6 is connected to an auxiliary output of the trigger generator 8. In particular, during the disablement phase of the circuit 13, the thyristors 5 and 6 are excited in parallel from the trigger generator 8 in response to a signal, applied to the trigger generator 8 from the source 9 via path 18, that the arc through the workpiece 10 has been extinguished. Such latter signal is coupled to the input 16 of the switched rectifier 1 via path 14, whereby such rectifier 1 is disabled to cut off the energizing of the capacitor 2. The above-mentioned desired ranges of values for the pulse duration, the pulse repetition frequency, the pulse height steepness and the pulse current density are illustrated with the aid of the graph of FIG. 2. In such graph, the quantity $I_A$ represents the DC component of the welding current flow, the quantity $I_B$ represents the pulse amplitude component of such current flow. Similarly, the quantity $T_A$ represents the pulse duration, and the quantity $T_B$ represents the pulse repetition interval.

In the operation of the arrangement of FIG. 1, the establishment of an arc between the welding electrode 12 and the workpiece 10 enables the switched rectifier 1 and the trigger generator 8 via the paths 14 and 18, respectively. As a result, charge builds up across the capacitor 2 until it reaches a level corresponding to the instant at which the first trigger pulse is applied to the thyristor 5 from the trigger generator 8.

At this instant, since the polarity of the voltage across the thyristor 5 is in the direction to cause conduction, the thyristor 5 is enabled to complete the series discharge path across the capacitor 2, and the latter discharges through the primary winding 17 of the transformer 4. The pulse voltage thus built up in the secondary winding 19 is coupled via the blocking diode 7 to the welding electrode 12 to constitute the cyclic pulse component of the welding current.

As indicated before, the duration of such pulse is determined by the interval between the start of discharge of the capacitor 2 and the reversal of polarity across the thyristor 5, which in turn is determined by the characteristics of oscillation of the discharge circuit for the capacitor 2. Immediately after discharge of the capacitor 2, the latter begins to charge again through the still enabled switched rectifier 1, after which the next occurrence of a trigger pulse from the generator 8 will initiate the next discharge of the capacitor, and so forth.

At the time of extinguishing of the arc, the DC welding source 9 responds to the resulting open-circuit condition by applying a second pulse to the switched rectifier 1 and the trigger generator 8 via the paths 14 and 18, respectively.

Such second pulse operates to disable the rectifier 1, and simultaneously switches the output conditions of the trigger circuit 8 so that both the thyristors 5 and 6 are simultaneously operated. As a result, the further excitation of the capacitor 2 is cut off and the charge already appearing across it is isolated from the pulse transformer 4 (and thereby from the welding electrode 12) by the shunting action of the now-operative second thyristor 6, so that the entire circuit is positively disabled.

In the foregoing, the invention has been described in connection with a preferred arrangement thereof. Many variations and modifications will now occur to those skilled in the art. It is accordingly desired that the scope of the appended claims not be limited to the specific disclosure herein contained.

What is claimed is:

1. In a method of welding a workpiece with a consumable welding electrode wherein the welding current includes a steady DC component upon which is superimposed a cyclic pulse component, the improvement wherein the steady DC component is supplied to the welding electrode with a current density greater than 100 amps/mm$^2$; and wherein the pulse component is supplied to the welding electrode with a duration in the range of $0.5 \times 10^{-4}$ to $5 \times 10^{-4}$ sec. a pulse-front steepness greater than $8 \times 10^6$ amps/sec., a pulse repetition frequency in the range 200–1,000 Hz and a current density greater than 720 amps/mm$^2$.

* * * * *